United States Patent
Liu et al.

(10) Patent No.: US 11,546,269 B2
(45) Date of Patent: Jan. 3, 2023

(54) SCHEDULING METHOD AND APPARATUS FOR A QUALITY OF SERVICE DATA FLOW

(71) Applicant: HUAWEI TECHNOLOGIES CO., LTD., Guangdong (CN)

(72) Inventors: Jiwu Liu, Beijing (CN); Yanbing Li, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/911,455

(22) Filed: Jun. 25, 2020

(65) Prior Publication Data
US 2020/0328983 A1 Oct. 15, 2020

Related U.S. Application Data

(63) Continuation of application No. PCT/CN2018/121584, filed on Dec. 17, 2018.

(30) Foreign Application Priority Data

Dec. 27, 2017 (CN) .......................... 201711449377.5

(51) Int. Cl.
*H04L 47/6295* (2022.01)
*H04L 47/215* (2022.01)
(Continued)

(52) U.S. Cl.
CPC ........ *H04L 47/6295* (2013.01); *H04L 47/215* (2013.01); *H04L 47/24* (2013.01); *H04L 47/527* (2013.01); *H04L 69/16* (2013.01)

(58) Field of Classification Search
CPC ... H04L 47/6295; H04L 47/215; H04L 47/24; H04L 47/527; H04L 69/16
See application file for complete search history.

(56) References Cited

U.S. PATENT DOCUMENTS

2009/0168793 A1* 7/2009 Fox .................. H04L 47/10 370/412
2012/0044805 A1* 2/2012 Lee .................. H04W 28/0278 370/230
(Continued)

FOREIGN PATENT DOCUMENTS

CN 102427598 A 4/2012
CN 103650460 A 3/2014
(Continued)

OTHER PUBLICATIONS

3GPP TS 23.501 V15.0.0 (Dec. 2017), "3rd Generation Partnership Project; Technical Specification Group Services and System Aspects; System Architecture for the 5G System; Stage 2 (Release 15)," Dec. 2017, 181 pages.

(Continued)

*Primary Examiner* — Chi H Pham
*Assistant Examiner* — Weibin Huang
(74) *Attorney, Agent, or Firm* — Fish & Richardson P.C.

(57) ABSTRACT

This application provides a scheduling method and an apparatus. The method includes: determining, by an application processor, a type of a to-be-sent data packet, and putting, by the application processor, the to-be-sent data packet into a quality of service QoS data flow corresponding to the type of the to-be-sent data packet, where the type of the to-be-sent data packet is a GBR type or a non-GBR type; and scheduling, by the application processor, a to-be-sent data packet in a QoS data flow corresponding to the GBR type to send the to-be-sent data packet to a modem in a terminal in which the application processor is located, and after determining that a data transmission rate requirement of the GBR type is met, scheduling, by the application processor, a to-be-sent data packet in a QoS data flow (Continued)

corresponding to the non-GBR type to send the to-be-sent data packet to the modem.

20 Claims, 8 Drawing Sheets

(51) Int. Cl.
*H04L 47/24* (2022.01)
*H04L 47/52* (2022.01)
*H04L 69/16* (2022.01)

(56) References Cited

U.S. PATENT DOCUMENTS

| | | | | |
|---|---|---|---|---|
| 2012/0218892 | A1* | 8/2012 | Kotecha | H04L 47/20 370/235 |
| 2013/0223335 | A1* | 8/2013 | Kwag | H04W 48/18 370/328 |
| 2016/0073413 | A1* | 3/2016 | Abrahams | H04L 5/006 370/329 |
| 2017/0202004 | A1* | 7/2017 | Hurd | H04L 47/28 |
| 2017/0359749 | A1 | 12/2017 | Dao | |
| 2019/0149629 | A1* | 5/2019 | Wetterwald | H04L 67/5681 709/217 |

FOREIGN PATENT DOCUMENTS

| | | |
|---|---|---|
| CN | 103841538 A | 6/2014 |
| CN | 102916901 B | 3/2015 |
| CN | 104702535 A | 6/2015 |

OTHER PUBLICATIONS

Office Action issued in Chinese Application No. 201711449377.5 dated Apr. 3, 2020, 12 pages (with English translation).

PCT International Search Report and Written Opinion issued in International Application No. PCT/CN2018/121584 dated Feb. 28, 2019, 17 pages (with English translation).

Samsung, "Transport level packet marking provided by SMF," SA WG2 Meeting #121, S2-173185, Hangzhou, P.R. China, May 15-19, 2017, 5 pages.

* cited by examiner

SCHEDULING METHOD AND APPARATUS FOR A QUALITY OF SERVICE DATA FLOW

CROSS-REFERENCE TO RELATED APPLICATIONS

This application is a continuation of International Application No. PCT/CN2018/121584, filed on Dec. 17, 2018, which claims priority to Chinese Patent Application No. 201711449377.5, filed on Dec. 27, 2017. The disclosures of the aforementioned applications are hereby incorporated by reference in their entireties.

TECHNICAL FIELD

The present invention relates to the field of communications technologies, and in particular, to a scheduling method and an apparatus.

BACKGROUND

A chip of a terminal usually includes an application processor and a communications processor. A TCP/IP protocol stack is run on the application processor, to process a network connection requirement of an application. A wireless communication protocol stack is usually run on the communications processor, and the TCP/IP protocol stack implements communication between the TCP/IP protocol stack and a modem in the communications processor by using a network adapter driver.

In the prior art, as shown in FIG. 1, a first in first out (FIFO) queue is disposed between a TCP/IP protocol stack and a network adapter driver. When a terminal performs uplink transmission, various types of service data (such as video and file downloading) are sent by an application processor to a modem by using the FIFO queue. In this manner, when there is a large amount of file downloading service data, video service data cannot be sent to the modem in time, and a data transmission rate requirement of the video cannot be further met.

In conclusion, currently, a scheduling method is urgently needed to resolve a prior-art technical problem that a data transmission rate requirement of a service cannot be met when the application processor sends data to the modem by using the FIFO queue.

SUMMARY

Embodiments of this application provide a scheduling method, to resolve a prior-art technical problem that a data transmission rate requirement of a service cannot be met when an application processor sends data to a modem by using an FIFO queue.

According to a first aspect, an embodiment of this application provides a scheduling method. The scheduling method includes:

determining, by an application processor, a type of a to-be-sent data packet, and putting, by the application processor, the to-be-sent data packet into a quality of service QoS data flow corresponding to the type of the to-be-sent data packet, where the type of the to-be-sent data packet is a guaranteed bit rate GBR type or a non-guaranteed bit rate non-GBR type; and scheduling, by the application processor, a to-be-sent data packet in a QoS data flow corresponding to the GBR type to send the to-be-sent data packet to a modem in a terminal in which the application processor is located, and after determining that a data transmission rate requirement of the GBR type is met, scheduling, by the application processor, a to-be-sent data packet in a QoS data flow corresponding to the non-GBR type to send the to-be-sent data packet to the modem.

In this way, the application processor puts, through filtering, to-be-sent data packets into the QoS data flow corresponding to the GBR type and the QoS data flow corresponding to the non-GBR type, and preferentially sends the to-be-sent data packet in the QoS data flow corresponding to the GBR type to the modem. After the data transmission rate requirement of the GBR type is met, the to-be-sent data packet in the QoS data flow corresponding to the non-GBR type is sent to the modem. In this way, QoS data flows are extended from the modem to the application processor. This effectively resolves a prior-art technical problem that a data transmission rate requirement of a service cannot be met because only one FIFO queue is disposed between a TCP/IP protocol stack and a network adapter driver.

In a possible design, the determining, by an application processor, a type of a to-be-sent data packet includes:

matching, by the application processor, the to-be-sent data packet with a plurality of QoS rules, where the QoS rule includes a QoS data flow identifier QFI; and determining, by the application processor based on a QFI in a first QoS rule that successfully matches the to-be-sent data packet and a mapping relationship between a QFI and a type, the type of the to-be-sent data packet.

In a possible design, the method further includes:

marking, by the application processor, the to-be-sent data packet by using the QFI in the first QoS rule.

In this way, the application processor marks the to-be-sent data packet. This effectively reduces processing burden of a communications processor (or the modem).

In a possible design, a header field is followed by a packet header of the to-be-sent data packet and content of the header field is the QFI in the first QoS rule, or a first field is included in a descriptor of the to-be-sent data packet and content of the first field is the QFI in the first QoS rule.

In a possible design, the putting, by the application processor, the to-be-sent data packet into a QoS data flow corresponding to the type of the to-be-sent data packet includes:

putting, by the application processor, the to-be-sent data packet into a QoS data flow corresponding to the QFI in the first QoS rule.

In a possible design, a rate at which the application processor schedules a to-be-sent data packet in the first QoS data flow is greater than or equal to a first GFBR, the first GFBR is a GFBR in a QoS rule that successfully matches the to-be-sent data packet in the first QoS data flow, and the first QoS data flow is any QoS data flow corresponding to the GBR type.

In this manner, a rate of scheduling a to-be-sent data packet of the GBR type meets a requirement.

In a possible design, a rate at which the application processor schedules a to-be-sent data packet in the second QoS data flow is less than or equal to an AMBR in a QoS parameter, and the second QoS data flow is any QoS data flow corresponding to the non-GBR type.

In this manner, a rate of scheduling a to-be-sent data packet of the non-GBR type meets a requirement.

In a possible design, the scheduling, by the application processor, a to-be-sent data packet in a QoS data flow corresponding to the GBR type includes: scheduling, by the application processor based on priorities of a plurality of QoS data flows corresponding to the GBR type, to-be-sent data packets in the plurality of QoS data flows corresponding to the GBR type; and the scheduling, by the application processor, a to-be-sent data packet in a QoS data flow corresponding to the non-GBR type includes: scheduling, by the application processor based on priorities of a plurality of QoS data flows corresponding to the non-GBR type, to-be-sent data packets in the plurality of QoS data flows corresponding to the non-GBR type.

It can be learned from the foregoing content that when scheduling to-be-sent data packets corresponding to the GBR type, the application processor determines a scheduling sequence based on priority level values (in other words, priorities) of queues corresponding to the GBR type. Compared with a prior-art manner in which there is only one FIFI queue, the manner in this embodiment of this application can effectively ensure that a to-be-sent data packet with a high priority can be preferentially sent to the modem.

When scheduling to-be-sent data packets corresponding to the non-GBR type, the application processor determines a scheduling sequence based on priority level values (in other words, priorities) of queues corresponding to the non-GBR type. Compared with the prior-art manner in which there is only one FIFI queue, the manner in this embodiment of this application can effectively ensure that a to-be-sent data packet with a high priority can be preferentially sent to the modem.

According to a second aspect, an embodiment of this application provides an application processor. The application processor includes:

a processing module, configured to: determine a type of a to-be-sent data packet, and put the to-be-sent data packet into a quality of service QoS data flow corresponding to the type of the to-be-sent data packet, where the type of the to-be-sent data packet is a guaranteed bit rate GBR type or a non-guaranteed bit rate non-GBR type; and a scheduling module, configured to: schedule a to-be-sent data packet in a QoS data flow corresponding to the GBR type to send the to-be-sent data packet to a modem in a terminal in which the application processor is located, and after determining that a data transmission rate requirement of the GBR type is met, schedule a to-be-sent data packet in a QoS data flow corresponding to the non-GBR type to send the to-be-sent data packet to the modem.

In a possible design, the processing module is specifically configured to:

match the to-be-sent data packet with a plurality of QoS rules, where the QoS rule includes a QoS data flow identifier QFI; and determine, based on a QFI in a first QoS rule that successfully matches the to-be-sent data packet and a mapping relationship between a QFI and a type, the type of the to-be-sent data packet.

In a possible design, the processing module is further configured to:

mark the to-be-sent data packet by using the QFI in the first QoS rule.

In a possible design, a header field is followed by a packet header of the to-be-sent data packet and content of the header field is the QFI in the first QoS rule, or a first field is included in a descriptor of the to-be-sent data packet and content of the first field is the QFI in the first QoS rule.

In a possible design, the processing module is specifically configured to:

put the to-be-sent data packet into a QoS data flow corresponding to the QFI in the first QoS rule.

In a possible design, a rate at which the scheduling module schedules a to-be-sent data packet in the first QoS data flow is greater than or equal to a first GFBR, the first GFBR is a GFBR in a QoS rule that successfully matches the to-be-sent data packet in the first QoS data flow, and the first QoS data flow is any QoS data flow corresponding to the GBR type.

In a possible design, a rate at which the scheduling module schedules a to-be-sent data packet in the second QoS data flow is less than or equal to an AMBR in a QoS parameter, and the second QoS data flow is any QoS data flow corresponding to the non-GBR type.

In a possible design, the scheduling module is specifically configured to:

schedule, based on priorities of a plurality of QoS data flows corresponding to the GBR type, to-be-sent data packets in the plurality of QoS data flows corresponding to the GBR type; and schedule, based on priorities of a plurality of QoS data flows corresponding to the non-GBR type, to-be-sent data packets in the plurality of QoS data flows corresponding to the non-GBR type.

According to a third aspect, an embodiment of this application provides a terminal. The terminal includes an application processor, and the application processor is configured to implement functions in the method example in the first aspect.

The terminal may further include a communications module and a communications processor, and the communications processor includes a modem. The communications module is configured to send, to the modem, a to-be-sent data packet scheduled by the application processor. The communications module may be a network adapter driver.

Further, the terminal may further include a memory, configured to store a program and the like. Specifically, the program may include program code, and the program code includes an instruction. The memory may include a random access memory (random access memory. RAM), and may further include a non-volatile memory (non-volatile memory), for example, at least one magnetic disk storage device. The application processor executes an application stored in the memory, to implement the foregoing functions.

In a possible manner, the communications module, the application processor, the communications processor, and the memory may be interconnected by using a bus. The bus may be a peripheral component interconnect (peripheral component interconnect, PCI) bus, an extended industry standard architecture (extended industry standard architecture, EISA) bus, or the like. The bus may be classified into an address bus, a data bus, a control bus, and the like.

An embodiment of this application further provides a computer storage medium. The storage medium stores a software program, and when a processor reads and executes the software program, the scheduling method provided in the foregoing aspects or the possible designs can be implemented.

An embodiment of this application further provides a computer program product including an instruction. When the instruction is run on a computer, the computer is enabled to perform the scheduling method in the foregoing aspects or the possible designs.

An embodiment of this application further provides a computer program. When the computer program is run on a computer, the computer is enabled to perform the scheduling method in the foregoing aspects or the possible designs.

DESCRIPTION OF EMBODIMENTS

The following describes the embodiments of this application in detail with reference to accompanying drawings of this specification, and a specific operation method in a method embodiment may also be applied to an apparatus embodiment or a system embodiment. In the descriptions of the embodiments of this application, unless otherwise stated, "a plurality of" means two or more than two.

A scheduling method provided in the embodiments of this application may be applicable to but is not limited to a fifth generation (5th Generation, 5G) new radio (new radio, NR) communications system.

Figure 2A:
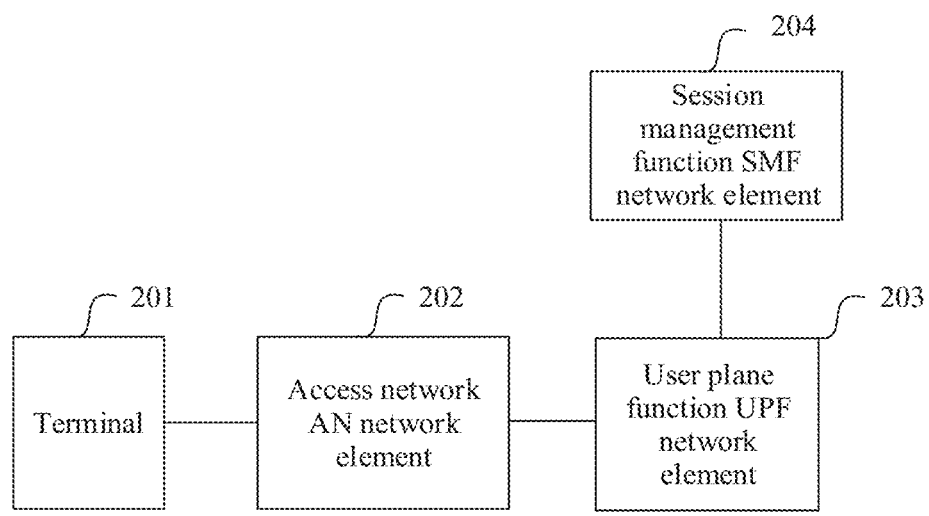
FIG. 2a is a schematic diagram of a network architecture of a 5G NR communications system to which this application is applicable.

The 5G NR communications system is used as an example. FIG. 2a is a schematic diagram of a network architecture of the 5G NR communications system to which this application is applicable. As shown in FIG. 2a, the network architecture includes a terminal 201, an access network (access network, AN) network element 202, a user plane function (user plane function, UPF) network element 203, and an SMF network element 204.

The terminal 201 is a device having a wireless transceiver function. The terminal 201 may be deployed on land, including an indoor or outdoor device, a handheld device, or a vehicle-mounted device, or may be deployed on water (for example, on a steamship), or may be deployed in the air (for example, on an airplane, on a balloon, or on a satellite). The terminal may be user equipment (user equipment, UE), a mobile phone (mobile phone), a tablet computer (pad), a computer having the wireless transceiver function, a virtual reality (virtual reality, VR) terminal, an augmented reality (augmented reality, AR) terminal, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home, or the like.

The AN network element 202 is configured to provide a network resource for the terminal 201. The AN network element 202 may be a base station in the 5G NR communications system, and is responsible for functions such as radio resource management, uplink and downlink data classification, QoS application, signaling processing jointly completed with a control plane network element, and data forwarding jointly completed with the UPF network element.

The UPF network element 203 is configured to route and forward a packet, perform QoS processing on user plane data, and the like.

Main functions of the SMF network element 204 include PDU session management, IP address allocation and management of the terminal, selection and management of the user plane function network element, downlink data notification, and the like.

A PDU session (session) is a link between the terminal and a data network, and one PDU session includes one or more quality of service data flows (QoS flow). In a PDU session establishment process, the SMF network element delivers, to the UE, a QoS parameter corresponding to a QoS flow.

Further, the QoS parameter may include but is not limited to the following content: one or more QoS rules (rule) and an aggregate maximum bit rate (aggregate max bit rate, AMBR) of the PDU session.

Specifically, the AMBR of the PDU session is used to limit a maximum data rate of all non-GBR QoS flows in the PDU session. Each QoS rule may include the following parameters: a quality of service rule identifier (QoS rule identifier, QRI), a quality of service data flow identifier (QoS flow identity, QFI), a data packet filter (packet filter) (optional), a priority of the QoS rule, and a 5G QoS identifier (5G QoS Identifier, 5QI). For a QoS flow of a GBR type a corresponding QoS rule further includes the following parameters: an uplink guaranteed flow bit rate (guaranteed flow bit rate, GFBR), a downlink GFBR, an uplink maximum flow bit rate (maximum flow bit rate, MFBR), and a downlink MFBR. The 5QI one-to-one corresponds to the QFI.

Further, Table 1 is a mapping table between a QFI and QoS features. The QoS features include a resource type (resource type), a priority level (priority level) value of a QoS data flow a data packet delay budget (packet delay budget), and a packet error rate (packet error rate).

TABLE 1

Mapping table between a QFI and QoS features

| QFI | Resource type | Priority level value | Data packet delay budge | Packet error rate |
|---|---|---|---|---|
| 1 | GBR | 20 | 100 ms | $10^{-2}$ |
| 2 | | 40 | 150 ms | $10^{-3}$ |
| 3 | | 30 | 50 ms | $10^{-3}$ |
| 4 | | 50 | 300 ms | $10^{-6}$ |
| 65 | | 7 | 75 ms | $10^{-2}$ |
| 66 | | 20 | 100 ms | $10^{-2}$ |
| 75 | | 25 | 50 ms | $10^{-2}$ |
| 5 | Non-GBR | 10 | 100 ms | $10^{-6}$ |
| 6 | | 60 | 300 ms | $10^{-6}$ |
| 7 | | 70 | 100 ms | $10^{-3}$ |
| 8 | | 80 | 300 ms | $10^{-6}$ |
| 9 | | 90 | 300 ms | $10^{-6}$ |
| 69 | | 5 | 60 ms | $10^{-6}$ |
| 70 | | 55 | 200 ms | $10^{-6}$ |
| 79 | | 65 | 50 ms | $10^{-2}$ |

Figure 2B:
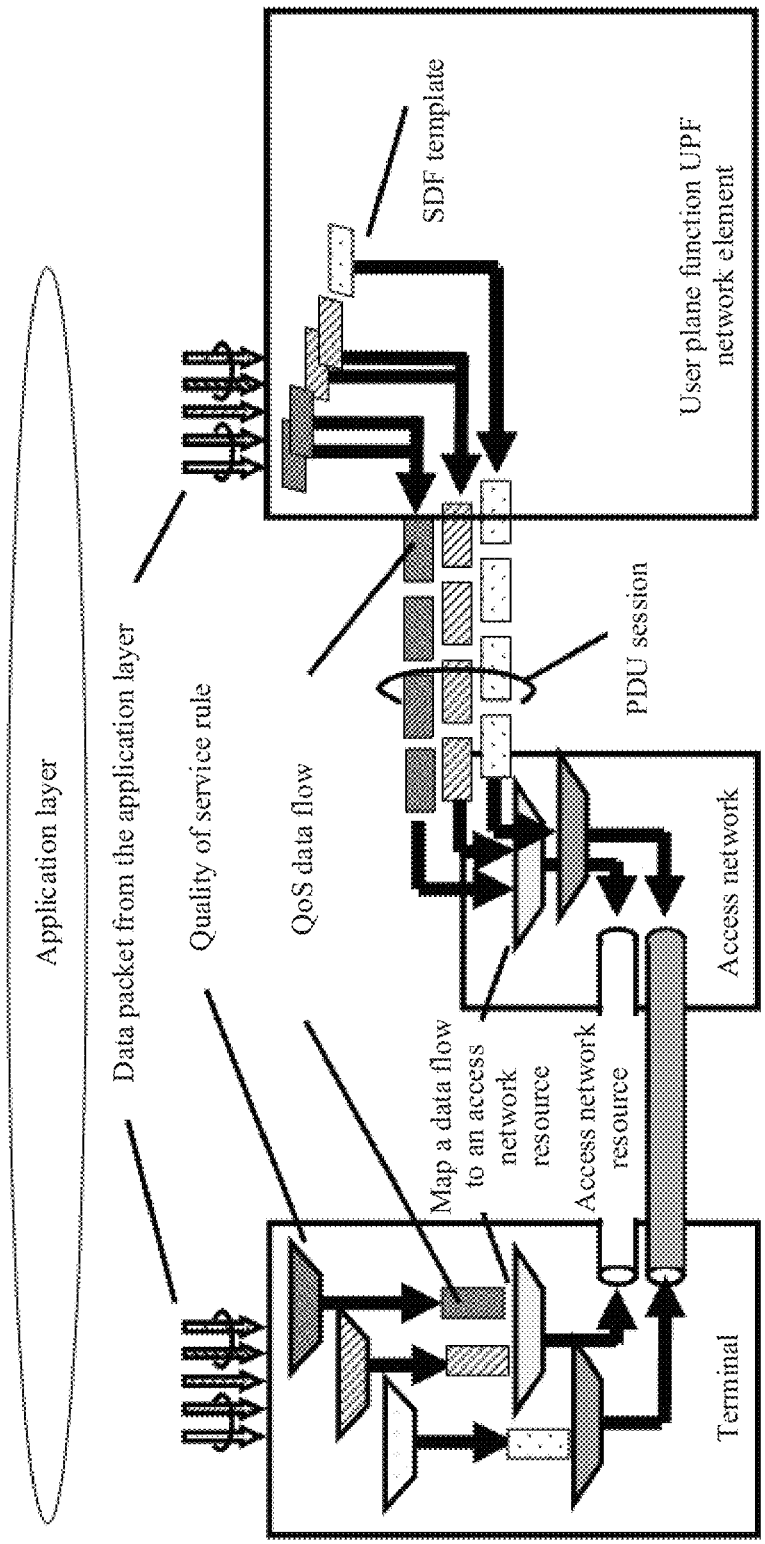
FIG. 2b is a schematic diagram of a QoS model.

Based on the network architecture shown in FIG. 2a, FIG. 2b is a schematic diagram of a QoS model. As shown in FIG. 2b, in a downlink direction, a UPF network element matches each service data flow (service data flow, SDF) template one by one based on a priority of the SDF template, classifies a downlink data packet, maps the downlink data packet to a quality of service data flow (QoS flow), and identifies each downlink data packet by using a QoS data flow identifier (QoS Flow Identifier. QFI). Then, an AN network element maps the downlink QoS flow to an access network resource, for example, a data radio bearer (Data Radio Bearers, DRB).

In an uplink direction, a terminal matches a data packet filter in each QoS rule one by one based on a priority of the QoS rule, classifies an uplink data packet, maps the uplink data packet to a QoS flow, and identifies each uplink data packet by using a QFI. Then, the QoS flow is mapped to an access network resource, for example, a DRB.

Figure 1:
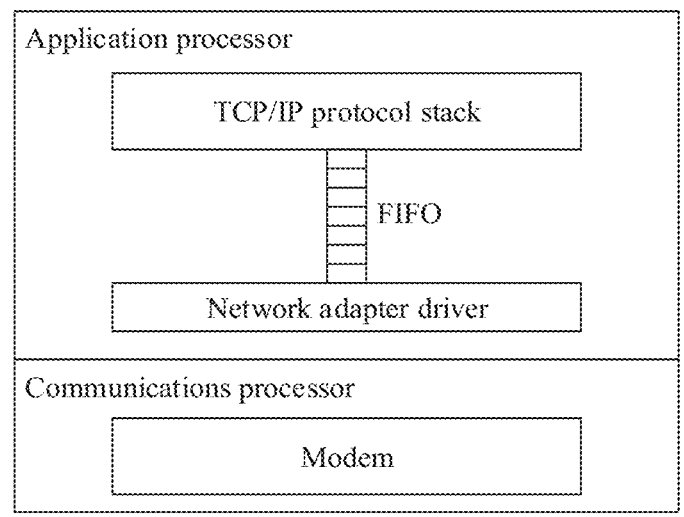
FIG. 1 is a schematic diagram of communication between an application processor and a modem in the prior art.

In the uplink direction, it can be learned from FIG. 1 that an application processor sends data to a modem by using an FIFO queue. However, only one FIFO queue is disposed between a TCP/IP protocol stack and a network adapter driver. As a result, data transmission rate requirements of some services cannot be effectively met.

In the embodiments of this application, considering that services may be mainly classified into two types: a GBR (Guaranteed Bit Rate, guaranteed bit rate) type and a non-GBR (Non-Guaranteed Bit Rate, non-guaranteed bit rate) type. A service of the GBR type has a relatively strict requirement for a delay and allows a relatively high data packet loss rate, for example, a conversational video service. A service of the non-GBR type has a relatively strict requirement for information integrity and does not allow a relatively high data packet loss rate, for example, a web browsing service or a file downloading service. Therefore, the application processor may put, through filtering, to-be-sent data packets into a QoS data flow corresponding to the GBR type and a QoS data flow corresponding to the non-GBR type, and preferentially send a to-be-sent data packet in the QoS data flow corresponding to the GBR type to the modem. After a data transmission rate requirement of the GBR type is met, a to-be-sent data packet in the QoS data flow corresponding to the non-GBR type is sent to the modem. It can be learned that in the embodiments of this application, the application processor puts the to-be-sent data packets into different QoS data flows. In this way, QoS data flows are extended from the modem to the application processor. This effectively resolves a prior-art technical problem that a data transmission rate requirement of a service cannot be met.

Figure 3:
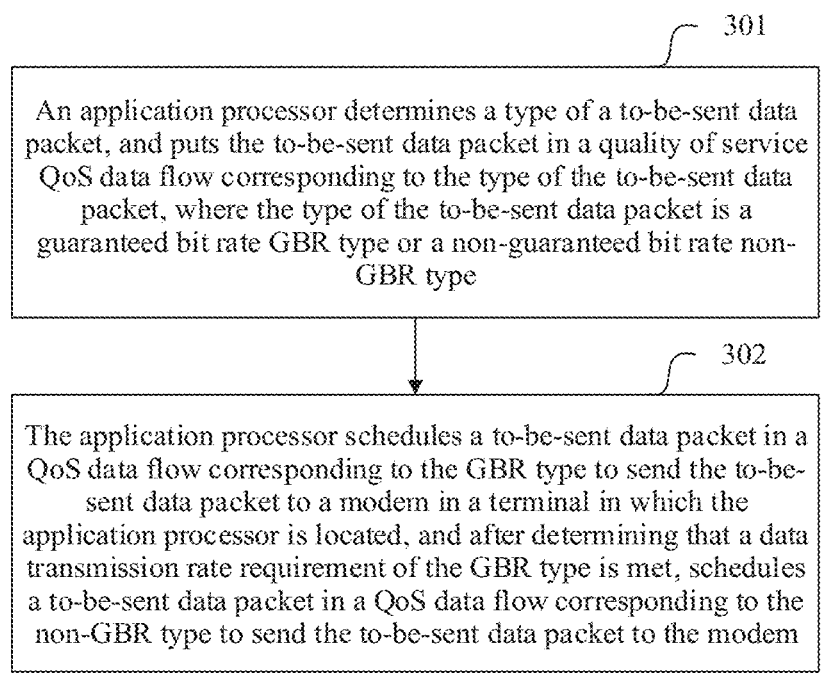
FIG. 3 is a schematic flowchart corresponding to a scheduling method according to an embodiment of this application.

FIG. 3 is a schematic flowchart corresponding to a scheduling method according to an embodiment of this application. As shown in FIG. 3, the method includes the following steps.

Step 301: An application processor determines a type of a to-be-sent data packet, and puts the to-be-sent data packet into a QoS data flow corresponding to the type of the to-be-sent data packet, where the type of the to-be-sent data packet is a GBR type or a non-GBR type.

Herein, there may be a plurality of to-be-sent data packets, for example, a to-be-sent data packet 1, a to-be-sent data packet 2, and a to-be-sent data packet 3. If the application processor determines that a type of the to-be-sent data packet 1 is the GBR type, the application processor puts the to-be-sent data packet into a QoS data flow corresponding to the GBR type. If the application processor determines that types of the to-be-sent data packet 2 and the to-be-sent data packet 3 are the non-GBR type, the application processor puts the to-be-sent data packet 2 and the to-be-sent data packet 3 into a QoS data flow corresponding to the non-GBR type. Using the GBR type as an example, that the application processor puts a to-be-sent data packet into a QoS data flow corresponding to the GBR type may be understood as that the application processor puts the to-be-sent data packet into a queue corresponding to the GBR type. Further, the queue may be an FIFO queue. To be specific, the QoS data flow may correspond to one queue in the application processor.

A to-be-sent data packet of the GBR type and a to-be-sent data packet of the non-GBR type may be distinguished in this manner, so that scheduling is subsequently performed based on a corresponding requirement.

Step 302: The application processor schedules the to-be-sent data packet in the QoS data flow corresponding to the GBR type, and after determining that a data transmission rate requirement of the GBR type is met, schedules a to-be-sent data packet in the QoS data flow corresponding to the non-GBR type.

Herein, when scheduling to-be-sent data packets, the application processor may preferentially schedule the to-be-sent data packet in the QoS data flow corresponding to the GBR type, and then schedule the to-be-sent data packet in the QoS data flow corresponding to the non-GBR type, to meet the data transmission rate requirement of the GBR type. Compared with a prior-art method in which an application processor schedules a to-be-sent data packet by using one FIFO queue, the method in this embodiment of this application can effectively ensure that the rate requirement of the GBR type is met.

Further, in step 301, there may be a plurality of specific manners in which the application processor determines the type of the to-be-sent data packet. In a possible implementation, the application processor obtains a quality of service QoS parameter, where the QoS parameter includes a plurality of QoS rules; matches the to-be-sent data packet with the plurality of QoS rules; and may determine the type of the to-be-sent data packet based on a QFI in a first QoS rule that successfully matches the to-be-sent data packet and a mapping relationship that is shown in Table 1 and that is between a QFI and a type.

Further, the QoS data flow corresponding to the type of the to-be-sent data packet may include one or more QoS data flows (in other words, queues), for example, a queue a1, a queue a2, and a queue a3. The QoS data flow corresponding to the non-GBR type may include a plurality of QoS data flows (in other words, queues), for example, a queue b1, a queue b2, and a queue b3. In this way, the application processor may put, based on the QFI in the first QoS rule that successfully matches the to-be-sent data packet, the to-be-sent data packet into a queue corresponding to the QFI in the first QoS rule.

In this embodiment of this application, the application processor may further mark the to-be-sent data packet based on the QFI in the first QoS rule.

Specifically, in this embodiment of this application, after successfully establishing a PDU session and receiving the QoS parameter configured by a network side, a terminal configures the plurality of QoS rules in the QoS parameter in a filter of the application processor. In this way, when the to-be-sent data packet passes through the filter of the application processor, the filter may match the to-be-sent data packet with the plurality of QoS rules in descending order of priorities of the plurality of QoS rules.

For example, the QoS parameter includes three QoS rules that are a QoS rule 1, a QoS rule 2, and a QoS rule 3. A priority of the QoS rule 1 is higher than a priority of the QoS rule 2, and the priority of the QoS rule 2 is higher than a priority of the QoS rule 3. In this way, for any to-be-sent data packet, the filter of the application processor may first match the to-be-sent data packet with the QoS rule 1. If the to-be-sent data packet successfully matches the QoS rule 1, the filter of the application processor determines a type of the to-be-sent data packet based on a QFI in the QoS rule 1, and marks the to-be-sent data packet by using the QFI in the QoS rule 1. If the to-be-sent data packet fails to match the QoS rule 1, the filter of the application processor matches the to-be-sent data packet with the QoS rule 2. If the to-be-sent data packet successfully matches the QoS rule 2, the filter of the application processor determines a type of the to-be-sent data packet based on a QFI in the QoS rule 2, and marks the to-be-sent data packet by using the QFI in the QoS rule 2. If the to-be-sent data packet fails to match the QoS rule 2, the filter of the application processor matches the to-be-sent data packet with the QoS rule 3. If the to-be-sent data packet successfully matches the QoS rule 3, the filter of the application processor determines a type of the to-be-sent data packet based on a QFI in the QoS rule 3, and marks the to-be-sent data packet by using the QFI in the QoS rule 3. If the to-be-sent data packet fails to match the QoS rule 3, the filter of the application processor discards the to-be-sent data packet.

It can be learned from the foregoing content that, in this embodiment of this application, the application processor classifies and marks the to-be-sent data packet. Compared with a prior-art manner in which a to-be-sent data packet is marked by using a modem, the manner in this application can effectively reduce burden of a communications processor.

There may be a plurality of specific manners in which the application processor marks the to-be-sent data packet by using a QFI in a QoS rule that successfully matches the to-be-sent data packet. In an example, the application processor adds a header field followed by a packet header of the to-be-sent data packet, and content of the header field includes the QFI in the QoS rule that successfully matches the to-be-sent data packet. In another example, the application processor adds a first field to a descriptor of the to-be-sent data packet, and content of the first field includes the QFI in the QoS rule that successfully matches the to-be-sent data packet.

In the foregoing manner, the application processor implements classification and marking of the to-be-sent data packet. The following specifically describes a scheduling process in step 302 on this basis.

Specifically, for any queue (in other words, a first queue) corresponding to the GBR type, the application processor may obtain a priority level value of the first queue based on a QFI for marking a to-be-sent data packet in the first queue and a mapping relationship (as shown in Table 1) between a QFI and a priority level value. For example, a QFI for marking a to-be-sent data packet in the queue a1 is 1, and a corresponding priority level value is 20. Therefore, it can be obtained that a priority level value of the queue a1 is 20. A QFI for marking a to-be-sent data packet in the queue a2 is 2, and a corresponding priority level value is 40. Therefore, it can be obtained that a priority level value of the queue a1 is 40. A QFI for marking a to-be-sent data packet in the queue a3 is 3, and a corresponding priority level value is 30. Therefore, it can be obtained that a priority level value of the queue a3 is 30. A larger priority level value indicates a lower priority, and a smaller priority level value indicates a higher priority.

The application processor may schedule, in descending order of priorities of queues corresponding to the GBR type (in other words, in ascending order of priority level values of the queues corresponding to the GBR type), to-be-sent data packets in the queues corresponding to the GBR type.

For example, the priority level value of the queue a2 is greater than the priority level value of the queue a3, and the priority level value of the queue a3 is greater than the priority level value of the queue a1. Therefore, the application processor may first schedule the to-be-sent data packet in the queue a1, and then schedule the to-be-sent data packet in the queue a3, and finally schedule the to-be-sent data packet in the queue a2.

It can be learned from the foregoing content that when scheduling the to-be-sent data packets corresponding to the GBR type, the application processor determines a scheduling sequence based on the priority level values (in other words, the priorities) of the queues corresponding to the GBR type. Compared with a prior-art manner in which there is only one FIFI queue, the manner in this embodiment of this application can effectively ensure that a to-be-sent data packet with a high priority can be preferentially sent to the modem.

Further, referring to the foregoing description about the QoS parameter, it can be learned that a QoS rule (which may be referred to as a first-type QoS rule for ease of description) that successfully matches a to-be-sent data packet in a queue corresponding to the GBR type further includes a GFBR. Therefore, when scheduling a to-be-sent data packet in any queue (the first queue) corresponding to the GBR type, the application processor may schedule the to-be-sent data packet in the first queue based on a GFBR in a QoS rule that successfully matches the to-be-sent data packet in the first queue. Specifically, a rate at which the application processor schedules the to-be-sent data packet in the first queue is greater than or equal to the GFBR in the QoS rule that successfully matches the to-be-sent data packet in the first queue. Still further, the first-type QoS rule further includes an MFBR, and the rate at which the application processor schedules the to-be-sent data packet in the first queue should be less than or equal to an MFBR in the QoS rule that successfully matches the to-be-sent data packet in the first queue. In this manner, a rate of scheduling the to-be-sent data packet of the GBR type meets a requirement.

In specific implementation, the application processor may set a token bucket (token bucket, TB) for each queue corresponding to the GBR type, and put a token into the token bucket at a GFBR (that is, a GFBR in a QoS rule that successfully matches each queue) corresponding to each queue. In this way, the rate of scheduling the to-be-sent data packet of the GBR type is controlled in a token bucket manner.

Figure 4:
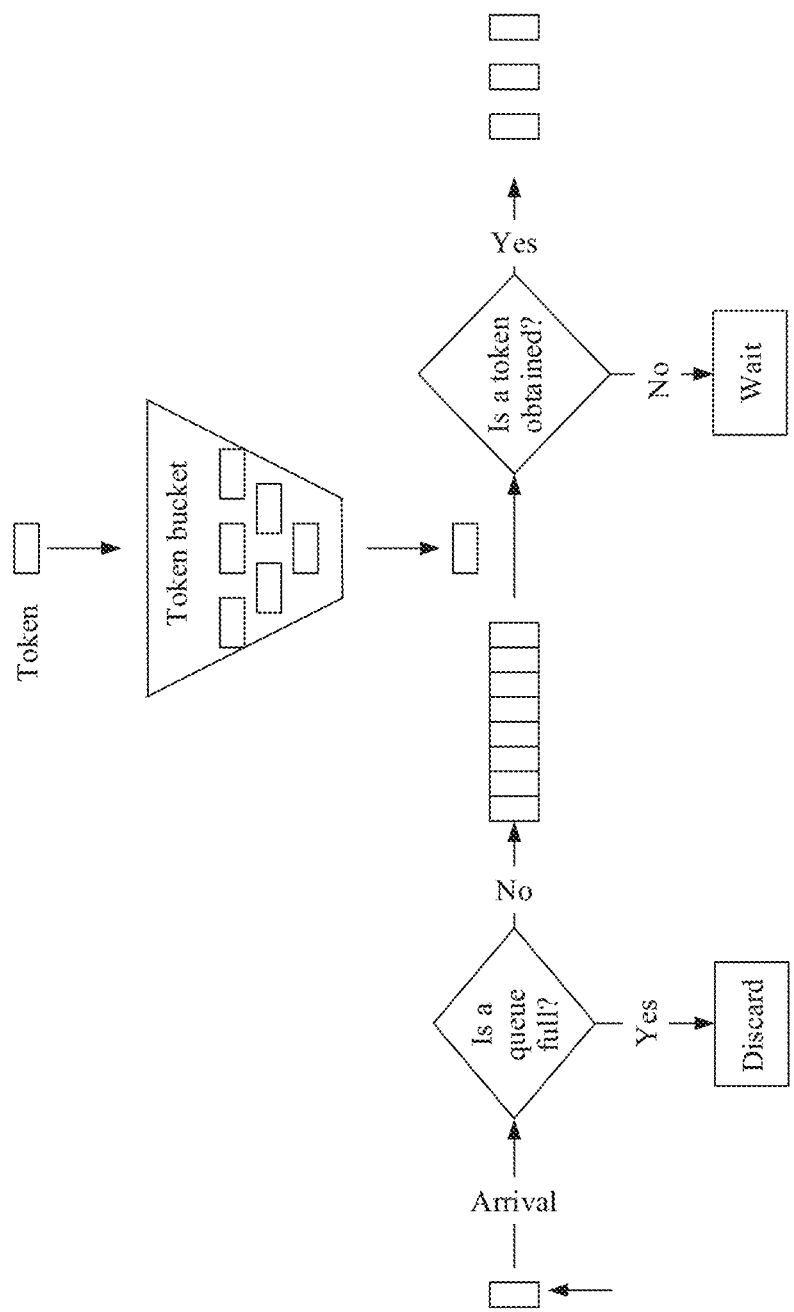
FIG. 4 is a schematic diagram of scheduling a to-be-sent data packet in a token bucket manner.

FIG. 4 is a schematic diagram of scheduling a to-be-sent data packet in a token bucket manner. As shown in FIG. 4, a token bucket is filled into a token bucket at a specific rate (for example, a GFBR). When the token bucket is full, a quantity of tokens in the token bucket does not increase any more. After determining that a to-be-sent data packet arrives, an application processor determines whether a queue of a to-be-sent data packet is full. If the queue of the to-be-sent data packet is full, the application processor discards the to-be-sent data packet. If the queue of the to-be-sent data packet is not full, the application processor puts the to-be-sent data packet into the queue. In a current scheduling period, when the application processor performs scheduling, a corresponding to-be-sent data packet is scheduled from the queue based on the quantity of tokens in the token bucket, and a corresponding token is simultaneously subtracted from the token bucket. If the tokens in the token bucket are used up, scheduling of the queue is completed in the current scheduling period (a remaining to-be-sent data packet in the queue may be scheduled in a next scheduling period), and another queue is scheduled. If all to-be-sent data packets in the queue are scheduled, scheduling of the queue is completed in the current scheduling period, and another queue is scheduled.

The application processor uses the foregoing scheduling manner. If scheduling of to-be-sent data packets in all queues corresponding to a GBR type is completed in the current scheduling period, it is determined that a data transmission rate requirement of the GBR type is met, and then a to-be-sent data packet in a queue corresponding to a non-GBR type may be scheduled.

To be specific, in this embodiment of this application, specifically, that the data transmission rate requirement of the GBR type is met includes content in two aspects: (1) A rate at which the application processor schedules a to-be-sent data packet in any queue corresponding to the GBR type meets the requirement, to be specific, a rate at which the application processor schedules a to-be-sent data packet in a first queue corresponding to the GBR type is greater than or equal to a GFBR in a QoS rule that successfully matches the to-be-sent data packet in the first queue, and is less than or equal to an MFBR in the QoS rule that successfully matches the to-be-sent data packet in the first queue. (2) In the current scheduling period, the application processor completes the scheduling of the to-be-sent data packets in all the queues corresponding to the GBR type.

Figure 5:
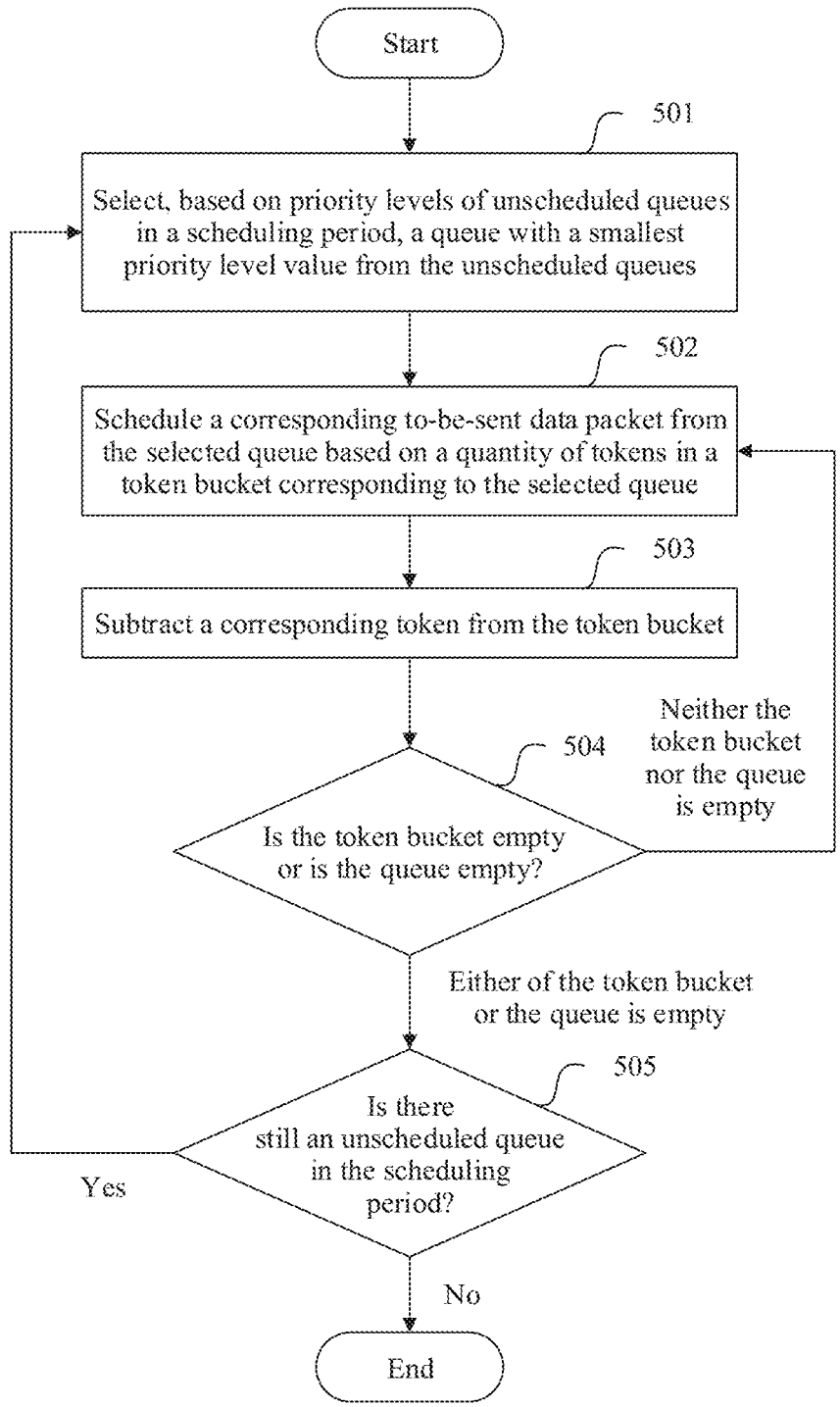
FIG. 5 is a schematic diagram of a procedure of scheduling a to-be-sent data packet of a GBR type in one scheduling period according to an embodiment of this application.

FIG. 5 is a schematic diagram of a procedure of scheduling a to-be-sent data packet of a GBR type in one scheduling period according to an embodiment of this application. As shown in FIG. 5, the procedure includes the following steps.

Step 501: Select, based on priority level values of unscheduled queues in the scheduling period, a queue with a smallest priority level value from the unscheduled queues.

Step 502: Schedule a corresponding to-be-sent data packet from the selected queue based on a quantity of tokens in a token bucket corresponding to the selected queue.

Step 503: Subtract a corresponding token from the token bucket.

Step 504: Determine whether the token bucket is empty and whether the queue is empty. If the token bucket is empty or the queue is empty, step 505 is performed. If the token bucket is not empty and the queue is not empty, step 502 is performed.

Step 505: Determine whether there is still an unscheduled queue in the scheduling period. If there is an unscheduled queue in the scheduling period, step 501 is performed. If there is no unscheduled queue in the scheduling period, scheduling of the to-be-sent data packet of the GBR type ends. In this case, it may be determined that a data transmission rate requirement of the GBR type is met, and a to-be-sent data packet in a queue corresponding to a non-GBR type may be scheduled.

It should be noted that when an application processor schedules a to-be-sent data packet in any queue corresponding to the GBR type, a phenomenon that a network adapter driver is blocked and cannot send the data packet to a modem may occur. In this case, the scheduling of the to-be-sent data packet may be stopped.

In this embodiment of this application, when scheduling the to-be-sent data packet in the queue corresponding to the non-GBR type, the application processor may obtain, based on a QFI for marking a to-be-sent data packet in any queue (in other words, a second queue) corresponding to the non-GBR type and a mapping relationship (as shown in Table 1) between a QFI and a priority level value, a priority level value of the second queue, and then schedules, in descending order of priorities of queues corresponding to the non-GBR type (in other words, in ascending order of priority level values of the queues corresponding to the non-GBR type), the to-be-sent data packet in the queue corresponding to the non-GBR type.

It can be learned from the foregoing content that when scheduling to-be-sent data packets corresponding to the non-GBR type, the application processor determines a scheduling sequence based on the priority level values (in other words, the priorities) of the queues corresponding to the non-GBR type. Compared with a prior-art manner in which there is only one FIFI queue, the manner in this embodiment of this application can effectively ensure that a to-be-sent data packet with a high priority can be preferentially sent to the modem.

Further, referring to the foregoing description of the QoS parameter, it can be learned that the QoS parameter further includes an AMBR of a PDU session. Therefore, the application processor may schedule the to-be-sent data packet in the second queue based on the AMBR of the PDU session. Specifically, a rate at which the application processor schedules the to-be-sent data packet in the second queue is less than or equal to the AMBR of the PDU session. To be specific, when the AMBR of the PDU session is met, the application processor may schedule all to-be-sent data packets in the second queue at a time.

In specific implementation, the application processor may set a token bucket for a queue corresponding to the non-GBR type, and put a token into the token bucket at the AMBR of the PDU session, to control, in a token bucket manner, a rate of scheduling the to-be-sent data packet of the non-GBR type.

Figure 6:
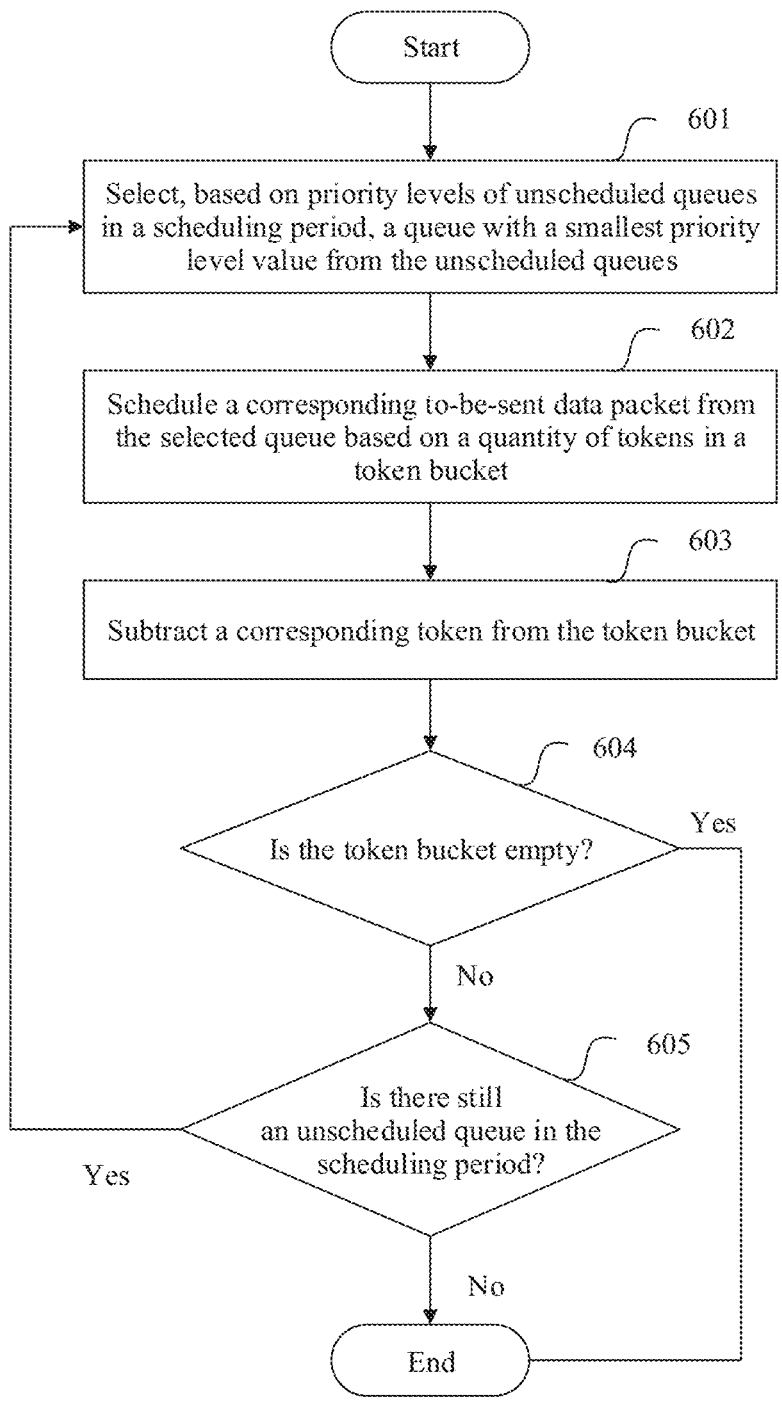
FIG. 6 is a schematic diagram of a procedure of scheduling a to-be-sent data packet of a non-GBR type in one scheduling period according to an embodiment of this application.

FIG. 6 is a schematic diagram of a procedure of scheduling a to-be-sent data packet of a non-GBR type in one scheduling period according to an embodiment of this application. As shown in FIG. 6, the procedure includes the following steps.

Step 601: Select, based on priority level values of unscheduled queues in the scheduling period, a queue with a smallest priority level value from the unscheduled queues.

Step 602: Schedule a corresponding to-be-sent data packet from the selected queue based on a quantity of tokens in a token bucket. Herein, if there are enough tokens in the token bucket, all to-be-sent data packets may be scheduled from the selected queue at a time.

Step 603: Subtract a corresponding token from the token bucket.

Step 604: Determine whether the token bucket is empty. If the token bucket is empty, scheduling of the to-be-sent data packet of the non-GBR type ends. If the token bucket is not empty, step 605 is performed.

Step 605: Determine whether there is still an unscheduled queue in the scheduling period. If there is an unscheduled queue in the scheduling period, step 601 is performed. If there is no unscheduled queue in the scheduling period, the scheduling of the to-be-sent data packet of the non-GBR type ends.

It should be noted that when an application processor schedules a to-be-sent data packet in any queue corresponding to the GBR type, a phenomenon that a network adapter driver is blocked and cannot send the data packet to a modem may occur. In this case, the scheduling of the to-be-sent data packet may be stopped.

Further, in one scheduling period, after scheduling a to-be-sent data packet of a GBR type and a to-be-sent data packet of the non-GBR type in the foregoing manner, the application processor may perform another round of scheduling on the to-be-sent data packet of the GBR type. In addition, for each queue corresponding to the GBR type, after rates of two rounds of scheduling are added, a maximum rate of each queue does not exceed an MFBR of the queue.

It should be noted that the queue and the queue described in this embodiment of this application is merely logical division. In specific implementation, the queue may be an FIFO queue, or the queue may be an FIFO queue.

Based on the foregoing content, a QoS queue model provided in this embodiment of this application may be referred to as a hybrid token bucket and priority FIFO queue (hybrid token bucket and priority FIFO queue, HTBP), and the HTBP queue model may be applied between a TCP/IP protocol stack and the network adapter driver. Further, in specific implementation, a corresponding HTBP queue model may be set for each network adapter, and HTBP queue models corresponding to different network adapters are independent of each other.

Figure 7:
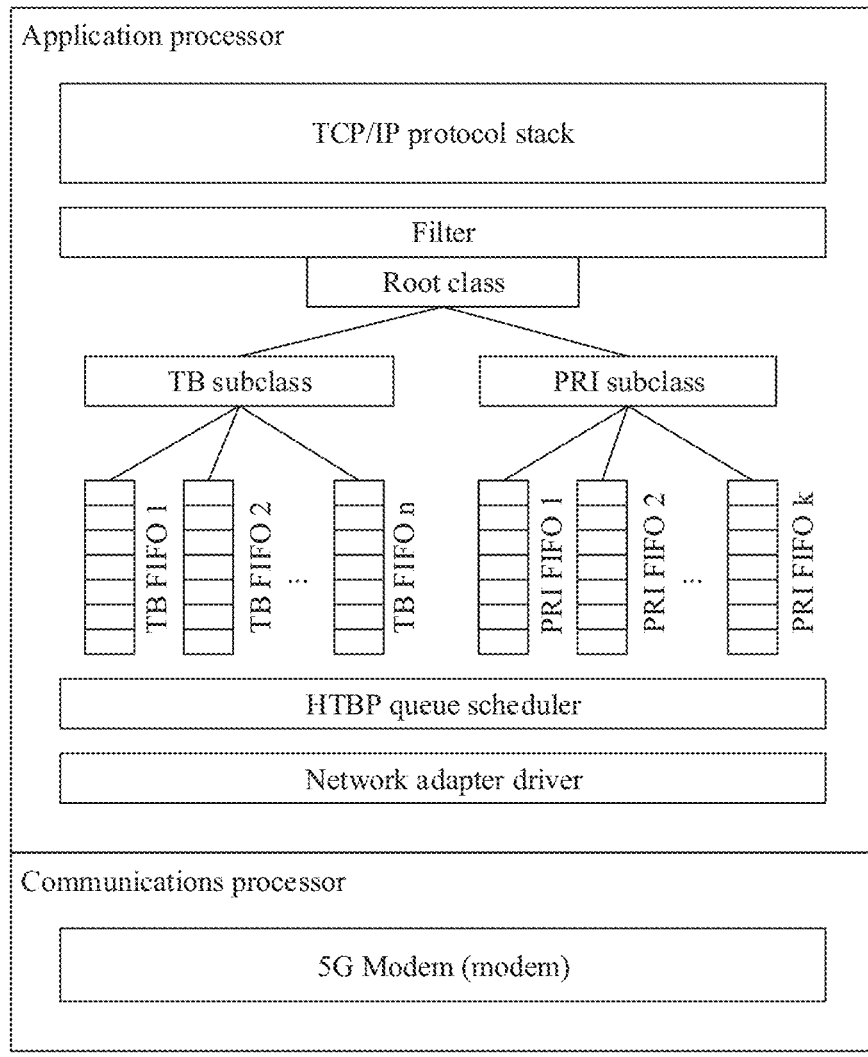
FIG. 7 is a schematic diagram of an HTBP queue model according to an embodiment of this application.

FIG. 7 is a schematic diagram of an HTBP queue model according to an embodiment of this application. As shown in FIG. 7, the HTBP queue model may include a filter, a root class, a TB subclass, a priority (priority, PRI) subclass, and an HTBP queue scheduler. An application processor establishes a corresponding FIFO queue for each QoS flow according to a QoS rule in a QoS parameter configured by a network. For a QoS flow of a GBR type, a TB FIFO queue is established under the TB subclass. For a QoS flow of a non-GBR a PRI FIFO queue is established under the PRI subclass. To be specific, the TB subclass corresponds to the GBR type described above, and the TB subclass may include one or more TB FIFO queues, for example, TB FIFO 1, TB FIFO 2, . . . , and TB FIFO n shown in FIG. 7. The PRI subclass corresponds to the non-GBR type described above, and the PRI subclass may include one or more PRI FIFO queues, for example, PRI FIFO 1, PRI FIFO 2, . . . , and PRI FIFO k shown in FIG. 7.

When a to-be-sent data packet (in other words, an uplink data packet) passes through the filter, the filter matches the to-be-sent data packet with a plurality of QoS rules one by one in descending order of priorities of the plurality of QoS rules. A successfully matched to-be-sent data packet is marked by using a QFI in a corresponding QoS rule, and then the to-be-sent data packet is put into a corresponding TB FIFO queue or a corresponding PRI FIFO queue based on the QFI for marking the to-be-sent data packet.

For each TB FIFO, a corresponding token bucket algorithm may be used to ensure a GFBR bandwidth. For the PRI subclass, the token bucket algorithm may be used to limit rates of all PRI FIFO queues of the PRI subclass. During scheduling, the HTBP queue scheduler schedules the TB subclass first, and after determining that a data transmission rate requirement of the GBR type is met, schedules the PRI subclass. For a specific implementation, refer to the foregoing description. Details are not described herein.

It can be learned from the foregoing content that, in this embodiment of this application, one QoS queue model is inserted between a TCP/IP protocol stack on an application processor side and a network adapter driver on the application processor side, to ensure QoS on a path from the application processor to a communications processor.

For the foregoing method procedure, an embodiment of this application further provides an application processor. For specific implementation of the application processor, refer to the description of the foregoing method.

Figure 8:
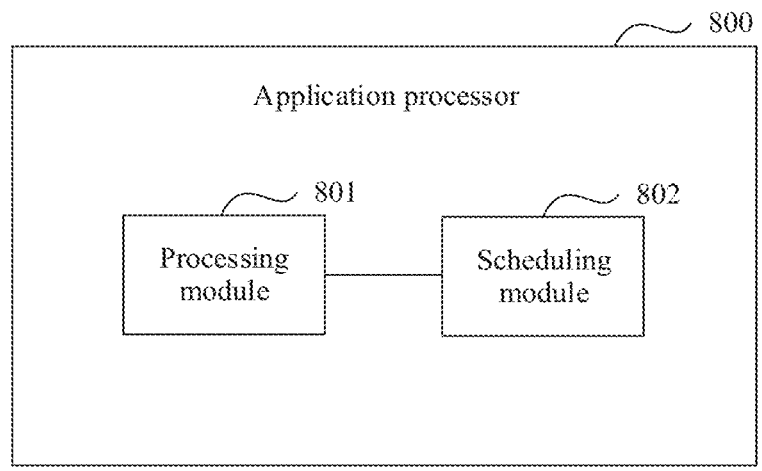
FIG. 8 is a schematic structural diagram of an application processor according to an embodiment of this application.

FIG. 8 is a schematic structural diagram of an application processor according to an embodiment of this application.

The application processor is configured to perform the procedures or the steps shown in FIG. 3, FIG. 5, and FIG. 6. As shown in FIG. 8, the application processor 800 includes a processing module 801 and a scheduling module 802.

The processing module 801 is configured to: determine a type of a to-be-sent data packet, and put the to-be-sent data packet into a quality of service QoS data flow corresponding to the type of the to-be-sent data packet, where the type of the to-be-sent data packet is a guaranteed bit rate GBR type or a non-guaranteed bit rate non-GBR type.

The scheduling module 802 is configured to: schedule a to-be-sent data packet in a QoS data flow corresponding to the GBR type to send the to-be-sent data packet to a modem in a terminal in which the application processor is located, and after determining that a data transmission rate requirement of the GBR type is met, schedule a to-be-sent data packet in a QoS data flow corresponding to the non-GBR type to send the to-be-sent data packet to the modem.

In a possible design, the processing module 801 is specifically configured to:

match the to-be-sent data packet with a plurality of QoS rules, where the QoS rule includes a QoS data flow identifier QFI; and determine, based on a QFI in a first QoS rule that successfully matches the to-be-sent data packet and a mapping relationship between a QFI and a type, the type of the to-be-sent data packet.

In a possible design, the processing module 801 is further configured to:

mark the to-be-sent data packet by using the QFI in the first QoS rule.

In a possible design, a header field is followed by a packet header of the to-be-sent data packet and content of the header field is the QFI in the first QoS rule, or a first field is included in a descriptor of the to-be-sent data packet and content of the first field is the QFI in the first QoS rule.

In a possible design, the processing module 801 is specifically configured to:

put the to-be-sent data packet into a QoS data flow corresponding to the QFI in the first QoS rule.

In a possible design, a rate at which the scheduling module schedules a to-be-sent data packet in the first QoS data flow is greater than or equal to a first GFBR, the first GFBR is a GFBR in a QoS rule that successfully matches the to-be-sent data packet in the first QoS data flow, and the first QoS data flow is any QoS data flow corresponding to the GBR type.

In a possible design, a rate at which the scheduling module schedules a to-be-sent data packet in the second QoS data flow is less than or equal to an AMBR in a QoS parameter, and the second QoS data flow is any QoS data flow corresponding to the non-GBR type.

In a possible design, the scheduling module 802 is specifically configured to:

schedule, based on priorities of a plurality of QoS data flows corresponding to the GBR type, to-be-sent packets in the plurality of QoS data flows corresponding to the GBR type; and schedule, based on priorities of a plurality of QoS data flows corresponding to the non-GBR type, to-be-sent data packets in the plurality of QoS data flows corresponding to the non-GBR type.

It should be noted that, in the embodiments of this application, division into the modules is an example, is merely logical function division, and may be other division in an actual implementation. Functional modules in the embodiments of this application may be integrated into one processing module, or each of the modules may exist alone physically, or two or more modules may be integrated into one module. The integrated module may be implemented in a form of hardware, or may be implemented in a form of a software functional module.

When the integrated module is implemented in the form of a software functional module and sold or used as an independent product, the integrated module may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) or a processor (processor) to perform all or some of the steps of the methods described in the embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

Figure 9:
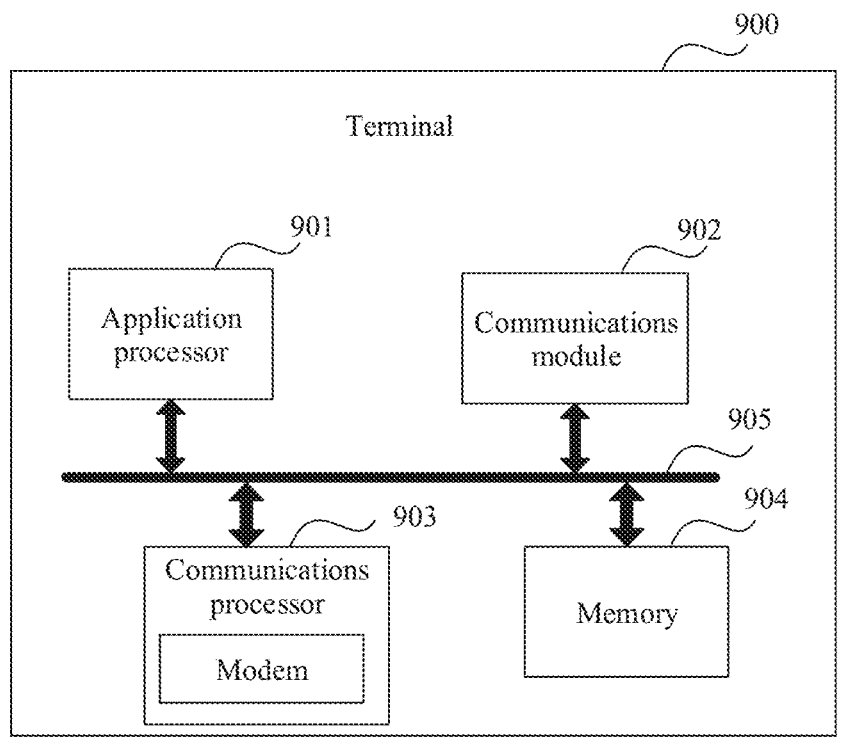
FIG. 9 is a schematic structural diagram of a terminal according to an embodiment of this application.

FIG. 9 is a schematic structural diagram of a terminal according to an embodiment of this application. The terminal 900 includes an application processor 901, and the application processor 901 is configured to perform the procedures or the steps shown in FIG. 3, FIG. 5, and FIG. 6. The terminal 900 may further include a communications module 902 and a communications processor 903. The communications processor 903 includes a modem. The communications module 902 is configured to send, to the modem, a to-be-sent data packet scheduled by the application processor 901, and the communications module 902 may be a network adapter driver.

Further, the terminal 900 may further include a memory 904, configured to store a program and the like. Specifically, the program may include program code, and the program code includes an instruction. The memory 904 may include a random access memory (random access memory, RAM), and may further include a non-volatile memory (non-volatile memory), for example, at least one magnetic disk storage device. The processor executes an application stored in the memory, to implement the foregoing functions.

In a possible manner, the communications module 902, the application processor 901, the communications processor 903, and the memory 904 may be interconnected by using a bus 905. The bus 905 may be a peripheral component interconnect (peripheral component interconnect, PCI) bus, an extended industry standard architecture (extended industry standard architecture. EISA) bus, or the like. The bus may be classified into an address bus, a data bus, a control bus, and the like.

A person skilled in the art should understand that the embodiments of the present invention may be provided as a method, a system, or a computer program product. Therefore, the embodiments of the present invention may use a form of hardware only embodiments, software only embodiments, or embodiments with a combination of software and hardware. Moreover, the embodiments of the present invention may use a form of a computer program product that is implemented on one or more computer-usable storage media (including but not limited to a magnetic disk memory, a CD-ROM, an optical memory, and the like) that include computer-usable program code.

The embodiments of the present invention are described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by the computer or the processor of another programmable data processing device generate an apparatus for implementing a specific function in one or more processes in the flowcharts and/or in one or more blocks in the block diagrams.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the embodiments of the present invention without departing from the spirit and scope of this application. This application is intended to cover these modifications and variations provided that they fall within the scope of protection defined by the following claims and their equivalent technologies.

What is claimed is:

1. A scheduling method, wherein the method comprises:
determining, by an application processor, a type of a to-be-sent data packet based on a quality of service (QoS) data flow identifier (QFI), wherein the determining the type of a to-be-sent data packet comprises:
matching, by the application processor, the to-be-sent data packet with a plurality of QoS rules, wherein each of the plurality of QoS rules comprises a respective QFI; and
determining the type of a to-be-sent data packet, by the application processor based on a QFI in a first QoS rule that successfully matches the to-be-sent data packet and a mapping relationship between the QFI and the type of the to-be-sent data packet;
putting, by the application processor, the to-be-sent data packet into a quality of service (QoS) data flow corresponding to the type of the to-be-sent data packet, wherein the type of the to-be-sent data packet is a guaranteed bit rate (GBR) type or a non-guaranteed bit rate (non-GBR) type;
scheduling, by the application processor, a to-be-sent data packet in a QoS data flow corresponding to the GBR type to send the to-be-sent data packet to a modem in a terminal in which the application processor is located, wherein the application processor is located outside of the modem; and after determining that a data transmission rate requirement of the GBR type is met, scheduling, by the application processor, a to-be-sent data packet in a QoS data flow corresponding to the non-GBR type to send the to-be-sent data packet to the modem.

2. The method according to claim 1, wherein the method further comprises:

marking, by the application processor, the to-be-sent data packet by using the QFI in the first QoS rule.

3. The method according to claim 2, wherein a header field is followed by a packet header of the to-be-sent data packet, and content of the header field is the QFI in the first QoS rule, or a first field is comprised in a descriptor of the to-be-sent data packet, and content of the first field is the QFI in the first QoS rule.

4. The method according to claim 1, wherein the putting, by the application processor, the to-be-sent data packet into a QoS data flow corresponding to the type of the to-be-sent data packet comprises:

putting, by the application processor, the to-be-sent data packet into a QoS data flow corresponding to the QFI in the first QoS rule.

5. The method according to claim 4, wherein a rate at which the application processor schedules the to-be-sent data packet in a first QoS data flow is greater than or equal to a first guaranteed flow bit rate (GFBR), the first GFBR is a GFBR in a QoS rule that successfully matches the to-be-sent data packet in the first QoS data flow, and the first QoS data flow is a QoS data flow corresponding to the GBR type.

6. The method according to claim 4, wherein a rate at which the application processor schedules the to-be-sent data packet in a second QoS data flow is less than or equal to an aggregate maximum bit rate (AMBR) in a QoS parameter, and the second QoS data flow is a QoS data flow corresponding to the non-GBR type.

7. The method according to claim 1, wherein the scheduling, by the application processor, a to-be-sent data packet in a QoS data flow corresponding to the GBR type comprises: scheduling, by the application processor based on priorities of a plurality of QoS data flows corresponding to the GBR type, to-be-sent data packets in the plurality of QoS data flows corresponding to the GBR type; and the scheduling, by the application processor, a to-be-sent data packet in a QoS data flow corresponding to the non-GBR type comprises: scheduling, by the application processor based on priorities of a plurality of QoS data flows corresponding to the non-GBR type, to-be-sent data packets in the plurality of QoS data flows corresponding to the non-GBR type.

8. An application processor, wherein the application processor comprises:

a processor, configured to:

determine a type of a to-be-sent data packet based on a quality of service (QoS) data flow identifier (QFI)), wherein the processor is configured to:

match the to-be-sent data packet with a plurality of QoS rules, wherein each of the plurality of QoS rules comprises a respective QFI; and determine the type of a to-be-sent data packet, based on a QFI in a first QoS rule that successfully matches the to-be-sent data packet and a mapping relationship between the QFI and the type of the to-be-sent data packet;

put the to-be-sent data packet into a quality of service (QoS) data flow corresponding to the type of the to-be-sent data packet, wherein the type of the to-be-sent data packet is a guaranteed bit rate (GBR) type or a non-guaranteed bit rate (non-GBR) type;

schedule a to-be-sent data packet in a QoS data flow corresponding to the GBR type to send the to-be-sent data packet to a modem in a terminal in which the application processor is located, wherein the application processor is located outside of the modem; and after determining that a data transmission rate requirement of the GBR type is met, schedule a to-be-sent data packet in a QoS data flow corresponding to the non-GBR type to send the to-be-sent data packet to the modem.

9. The application processor according to claim 8, wherein the processor is further configured to:

mark the to-be-sent data packet by using the QFI in the first QoS rule.

10. The application processor according to claim 9, wherein a header field is followed by a packet header of the to-be-sent data packet, and content of the header field is the QFI in the first QoS rule, or a first field is comprised in a descriptor of the to-be-sent data packet, and content of the first field is the QFI in the first QoS rule.

11. The application processor according to claim 8, wherein the processor is configured to:

put the to-be-sent data packet into a QoS data flow corresponding to the QFI in the first QoS rule.

12. The application processor according to claim 11, wherein a rate at which the processor schedules the to-be-sent data packet in a first QoS data flow is greater than or equal to a first GFBR, the first GFBR is a GFBR in a QoS rule that successfully matches the to-be-sent data packet in the first QoS data flow, and the first QoS data flow is a QoS data flow corresponding to the GBR type.

13. The application processor according to claim 11, wherein a rate at which the processor schedules the to-be-sent data packet in a second QoS data flow is less than or equal to an AMBR in a QoS parameter, and the second QoS data flow is a QoS data flow corresponding to the non-GBR type.

14. The application processor according to claim 8, wherein the processor is configured to:

schedule, based on priorities of a plurality of QoS data flows corresponding to the GBR type, to-be-sent data packets in the plurality of QoS data flows corresponding to the GBR type; and schedule, based on priorities of a plurality of QoS data flows corresponding to the non-GBR type, to-be-sent data packets in the plurality of QoS data flows corresponding to the non-GBR type.

15. A terminal, comprising:

a modem, and an application processor, wherein application processor configured to:

determine a type of a to-be-sent data packet based on a quality of service (QoS) data flow identifier (QFI), wherein the application processor is configured to:

match the to-be-sent data packet with a plurality of QoS rules, wherein each of the plurality of QoS rules comprises a respective QFI; and determine the type of a to-be-sent data packet, based on a QFI in a first QoS rule that successfully matches the to-be-sent data packet and a mapping relationship between the QFI and, the type of the to-be-sent data packet;

put the to-be-sent data packet into a quality of service (QoS) data flow corresponding to the type of the to-be-sent data packet, wherein the type of the to-be-sent data packet is a guaranteed bit rate (GBR) type or a non-guaranteed bit rate (non-GBR) type;

schedule a to-be-sent data packet in a QoS data flow corresponding to the GBR type to send the to-be-sent data packet to the modem, wherein the application processor is located outside of the modem; and after determining that a data transmission rate requirement of the GBR type is met, schedule a to-be-sent data packet in a QoS data flow corresponding to the non-GBR type to send the to-be-sent data packet to the modem.

16. The terminal according to claim 15, wherein the application processor is further configured to:

mark the to-be-sent data packet by using the QFI in the first QoS rule.

17. The terminal according to claim 16, wherein a header field is followed by a packet header of the to-be-sent data packet, and content of the header field is the QFI in the first QoS rule, or a first field is comprised in a descriptor of the to-be-sent data packet, and content of the first field is the QFI in the first QoS rule.

18. The terminal according to claim 15, wherein the application processor is configured to put the to-be-sent data packet into a QoS data flow corresponding to the QFI in the first QoS rule.

19. The terminal according to claim 18, wherein a rate at which the application processor schedules the to-be-sent data packet in a first QoS data flow is greater than or equal to a first guaranteed flow bit rate (GFBR), the first GFBR is a GFBR in a QoS rule that successfully matches the to-be-sent data packet in the first QoS data flow, and the first QoS data flow is a QoS data flow corresponding to the GBR type.

20. The terminal according to claim 18, wherein a rate at which the application processor schedules the to-be-sent data packet in a second QoS data flow is less than or equal to an aggregate maximum bit rate (AMBR) in a QoS parameter, and the second QoS data flow is a QoS data flow corresponding to the non-GBR type.

* * * * *